United States Patent
Waltman et al.

(10) Patent No.: US 7,526,249 B2
(45) Date of Patent: Apr. 28, 2009

(54) SATELLITE GROUND STATION TO RECEIVE SIGNALS WITH DIFFERENT POLARIZATION MODES

(75) Inventors: Steve Waltman, Boulder, CO (US); Mark Peting, Portland, OR (US)

(73) Assignee: Mediaur Technologies, Inc., Santa Monica, CA (US)

( * ) Notice: Subject to any disclaimer, the term of this patent is extended or adjusted under 35 U.S.C. 154(b) by 306 days.

(21) Appl. No.: 11/332,381

(22) Filed: Jan. 12, 2006

(65) Prior Publication Data
US 2006/0128336 A1    Jun. 15, 2006

Related U.S. Application Data

(63) Continuation-in-part of application No. 10/890,678, filed on Jul. 13, 2004.

(51) Int. Cl.
*H04B 7/185* (2006.01)
(52) U.S. Cl. .................. 455/12.1; 455/273; 455/276.1; 343/754; 343/757
(58) Field of Classification Search ................ 455/12.1, 455/273, 276.1; 343/754, 757, 776
See application file for complete search history.

(56) References Cited

U.S. PATENT DOCUMENTS

| | | | | |
|---|---|---|---|---|
| 5,594,941 A * | 1/1997 | Dent | .......................... | 455/13.4 |
| 5,812,096 A | 9/1998 | Tilford | | |
| 5,872,540 A * | 2/1999 | Casabona et al. | ........... | 342/362 |
| 6,633,744 B1 * | 10/2003 | Howell | ....................... | 455/12.1 |
| 7,024,158 B2 * | 4/2006 | Wiswell | ..................... | 455/12.1 |
| 7,202,833 B2 * | 4/2007 | Ho et al. | ..................... | 343/786 |

OTHER PUBLICATIONS

Per-Simon Kildal, et al., "Scalar Horn with Shaped Lens Improves Cassegrain Efficiency", IEEE Transactions on Anetnnas and Propagation, vol. AP-32, No. 10, Oct. 1984 (pp. 1094-1100).

* cited by examiner

*Primary Examiner*—Tho G Phan
(74) *Attorney, Agent, or Firm*—Blakely, Sokoloff, Taylor & Zafman LLP

(57) ABSTRACT

A satellite ground station to receive signals with different polarization modes is described. In one example, the system includes a method of receiving a signal from a satellite at a feed, producing a first signal having a first polarization and a second signal having a second orthogonal polarization from the feed signal, and synthesizing a third signal having a third polarization different from the first and second signal and a fourth signal having fourth polarization orthogonal to the third polarization.

6 Claims, 13 Drawing Sheets

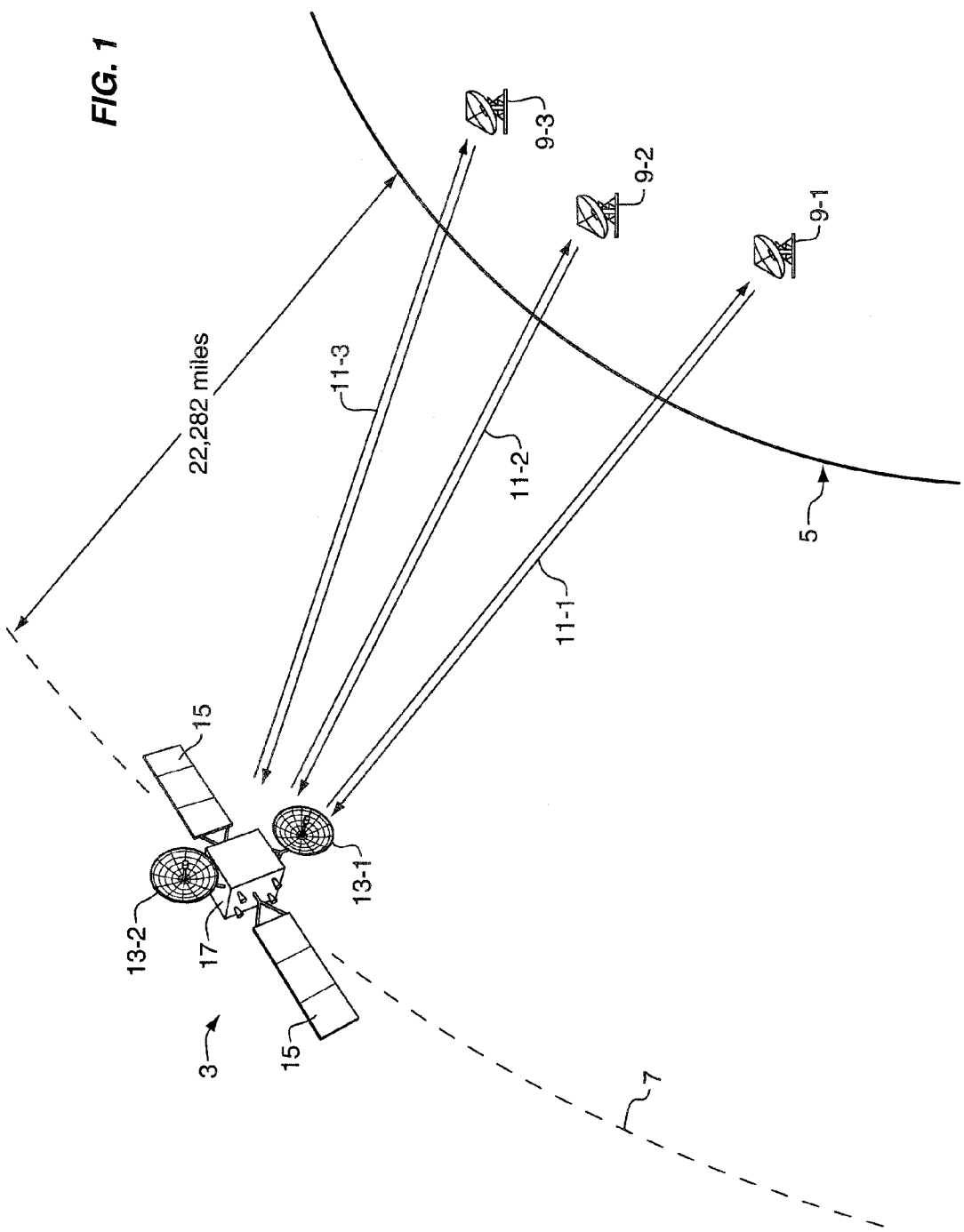

SATELLITE GROUND STATION TO RECEIVE SIGNALS WITH DIFFERENT POLARIZATION MODES

CROSS REFERENCE TO RELATED APPLICATIONS

This application is a continuation in Part of U.S. patent application Ser. No. 10/890,678, filed on Jul. 13, 2004, and entitled "Satellite Ground Station Antenna with Wide Field of View and Nulling Pattern", the priority of which is hereby claimed.

FIELD

The present description relates to ground station antennas for satellite communications and, in particular, to an antenna in which the angular field of view is wider than the spacing between a target satellite and neighboring interfering satellites.

BACKGROUND

The deployment of satellite dish antennas is limited by the size of the dish. C-band communications traditionally require about a six foot (200 cm) diameter dish. The size of the dish has significantly limited C-band ground station antennas to commercial and rural locations. C-band antennas are used, for example, by local television broadcasters to receive national programming and have been used by bars and hotels to receive special programming. With the advent of Ku-band satellites, ground station antennas with about a three or four foot (100-120 cm) dish were introduced. These antennas are commonly used by gas stations, retailers, and businesses for credit card transactions and internal business communications. Even the three foot dish is difficult for one person to install and difficult to conceal in smaller structures, such as restaurants and homes. With the advent of 18 inch (45 cm) dishes, satellite antennas have become acceptable and have found widespread use in homes and in businesses of all sizes. These antennas are promoted by DBS (Direct Broadcast Satellite) television broadcasters such as DIRECTV and Echostar (The Dish Network).

Three important factors that determine the size of the dish for a satellite antenna are the frequency of the communications signals, the power of the communication signals and the distance between satellites using the same frequency. Higher frequencies, such as Ku and Ka-band signals may be sent and received using smaller dishes than lower frequencies, such as C-band signals. Lower power signals require a larger dish to collect more energy from the transmitted signals. Finally, if the satellites are spaced close together in the sky, then a larger dish is required in order to distinguish the signals from one satellite from those of its neighbors. In DBS systems, several satellites are used very close together but the satellites use different frequencies so that the antenna can easily distinguish the signals.

In order to use fixed dish antennas, the satellite with which the antenna communicates must also be fixed relative to the position of the antenna. Most communication satellites accordingly are placed in an equatorial geosynchronous (geostationary) orbit. At the altitude corresponding to geosynchronous orbit (22,282 miles, 36,000 km), the satellites complete each orbit around the equator in one day, at the same speed that the earth rotates. From the earth, the satellite appears to stay in a fixed position over the equator.

Each position over the equator is assigned by an international agency such as the ITU (International Telecommunications Union) in cooperation with the appropriate ministries or commissions of the countries that may wish to use the positions, such as the U.S. FCC (Federal Communications Commissions). The positions have been divided into orbital slots and they are spaced apart by specified numbers of degrees. The degrees refer to the angle between the satellites as viewed from the earth. There are 360 degrees available around the globe for orbital slots, however, many of these are over the Pacific and Atlantic oceans. Note that a particular equatorial slot over the central United States may be useful also for Canada and much of Central and South America and that satellites separated by as little as two degrees will be over 1000 miles (1600 km) apart in orbit.

As mentioned above, two widely used frequency bands are C-band and Ku-band. Ka-band, at a higher frequency than Ku-band, is just entering into commercial use. The C-band was widely used before Ku-band became feasible, but its low frequency required large ground station antenna dishes or reflectors (over six feet, 200 cm). Ku-band is used in the U.S. for DBS television, using BSS (Broadcast Satellite Service) frequency and geosynchronous orbital slot assignments. International telephone, business-to-business networks, VSAT (Very Small Aperture Terminal) satellite networks, and, in Europe, DBS television services use FSS (Fixed Satellite Service) Ku-band frequency and geosynchronous orbital slot assignments.

BSS services are designed to be received by small dish antennas, with a diameter of 18-24 inches (45-60 cm). To support such a small dish, the satellites are in orbital slots spaced 9 degrees apart. FSS services are designed to be received by larger dish antennas, typically 36-48 inches (100-120 cm) in diameter. This larger diameter produces a narrower antenna pattern, which accommodates the 2 degree orbital spacing used for FSS. The larger orbital spacing for BSS limits the total number of slots available to accommodate BSS satellites.

SUMMARY

The present invention is applicable to satellite ground station antennas having a wide field of view in comparison to the satellites with which the antenna connects. One embodiment includes a parabolic reflector having a size that corresponds to a beam with an angular half-width larger than the spacing between neighboring interfering satellites. It also has a feed coupled to the parabolic reflector configured to have a high sensitivity for a target satellite within the angular half-width of the reflector beam and a low sensitivity for neighboring interfering satellites within the angular half-width of the reflector beam. Another embodiment includes projecting a first radiation pattern, such as a digital communications link, between a ground station antenna and a target satellite and projecting a second radiation pattern to a target interferer.

DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

FIG. 1 is a diagram of a satellite communications system of a type that may be used with an embodiment of the invention;

FIG. 10-1 shows a system to synthesize left-hand circular and right-hand circular polarization signals from vertical linear and horizontal linear signals provided by a dual-polarization antenna feed according to an embodiment of the invention;

FIG. 10-2 shows a system to synthesize vertical linear and horizontal linear polarization signals from left-hand circular and right-hand circular polarizations provided by a dual-polarization antenna feed according to an embodiment of the invention;

FIG. 10-3 shows a system to produce vertical linear, horizontal linear, left-hand circular, and right-hand circular polarization signals, or any set of desired polarizations signals, from a dual-polarization feed that provides two signals with orthogonal or nearly orthogonal polarizations of any type according to an embodiment of the invention;

FIG. 10-4 shows a system to cancel cross-polarization distortions in signals from orthogonal polarizations according to an embodiment of the invention;

FIG. 10-5 shows a system to stack signals from two polarizations after being combined to cancel interference in a phased array according to an embodiment of the invention; and FIG. 10-6 shows a system to stack signals from two polarizations before they are combined to cancel interference in a phased array according to an embodiment of the invention.

DETAILED DESCRIPTION

Figures 1, 10:
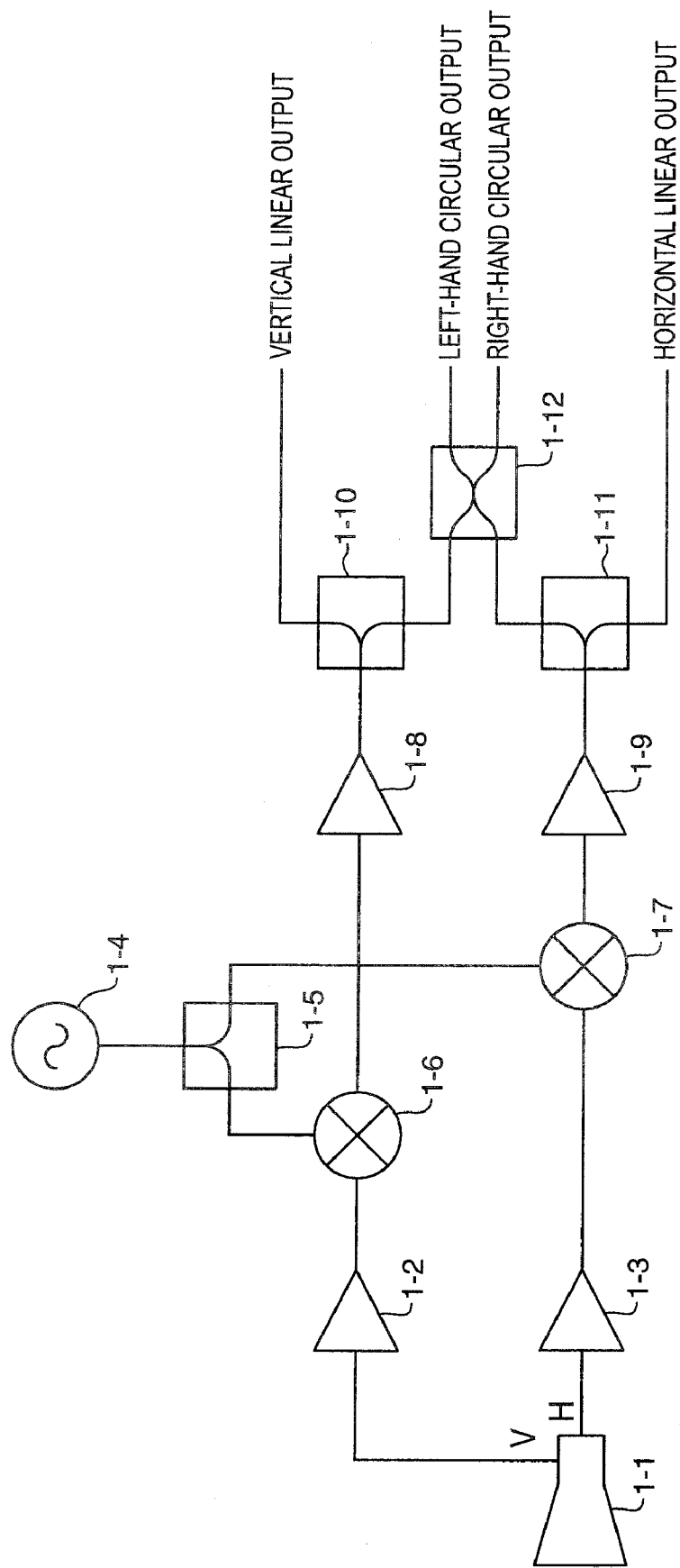
Figures 2, 10:
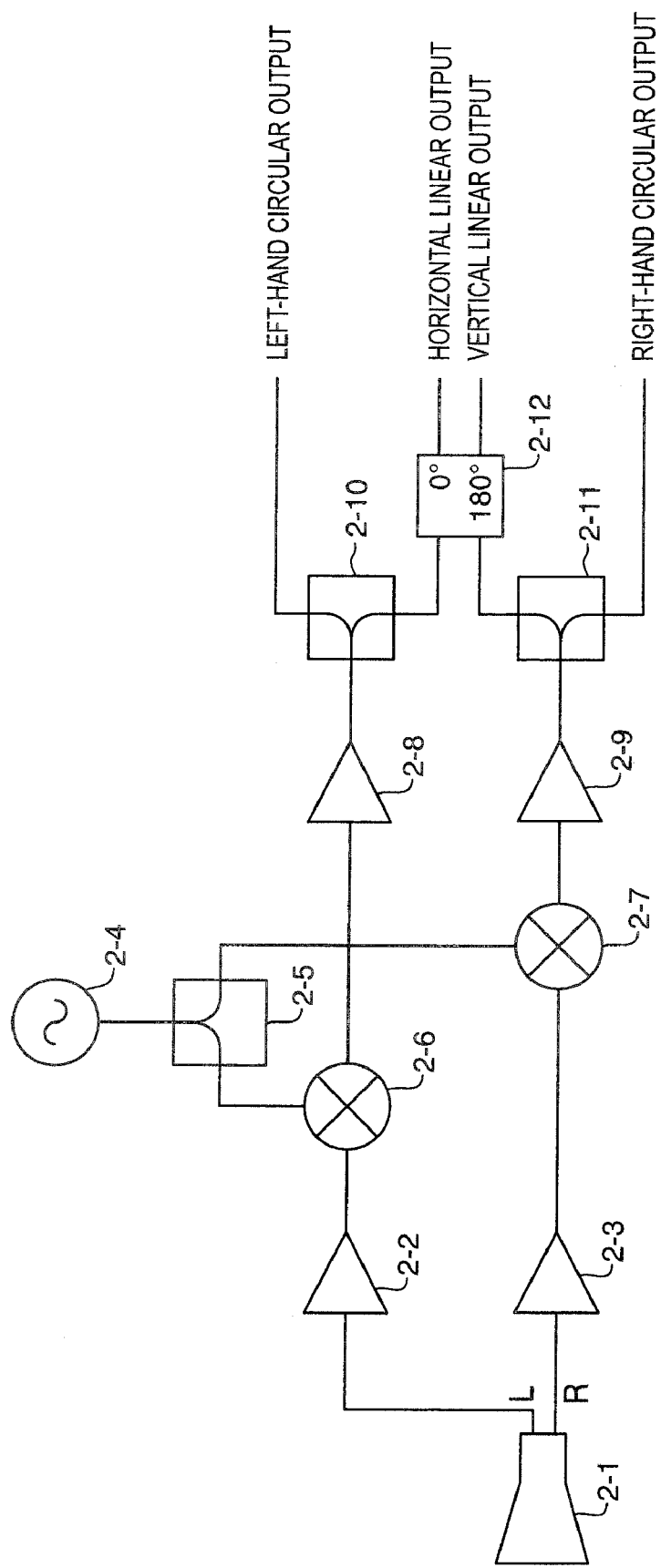
Figures 3, 10:
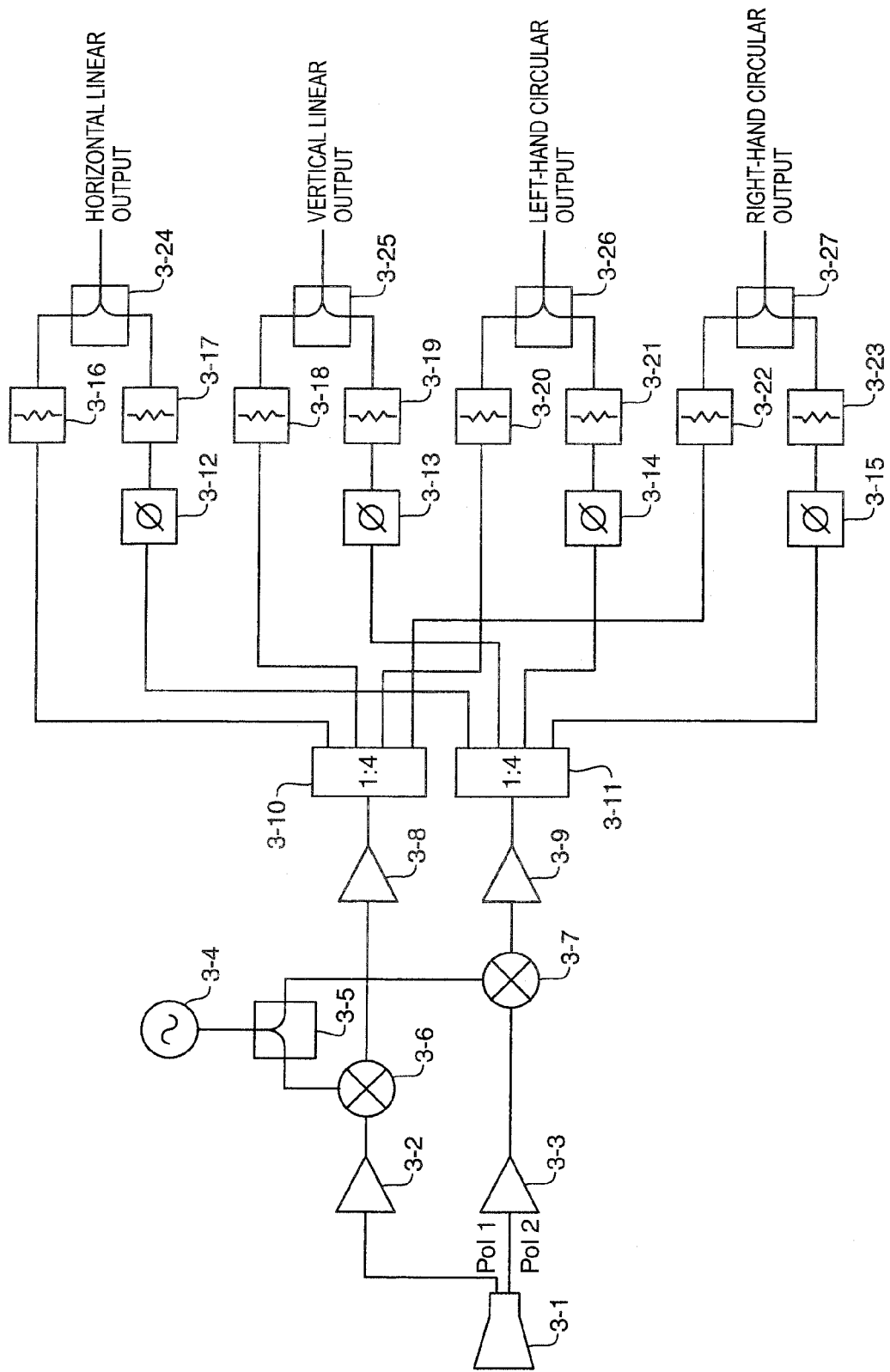
Figures 4, 10:
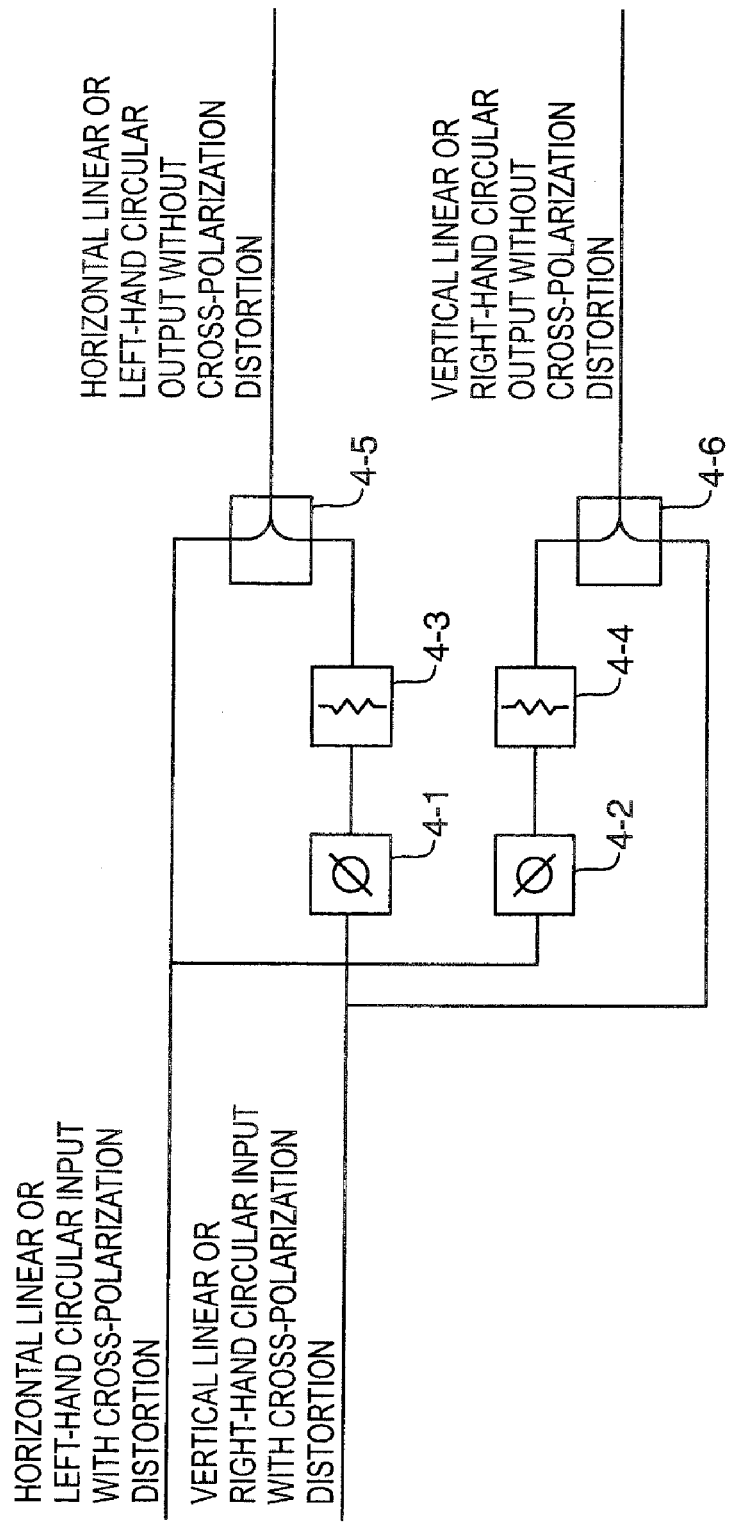
Figures 5, 10:
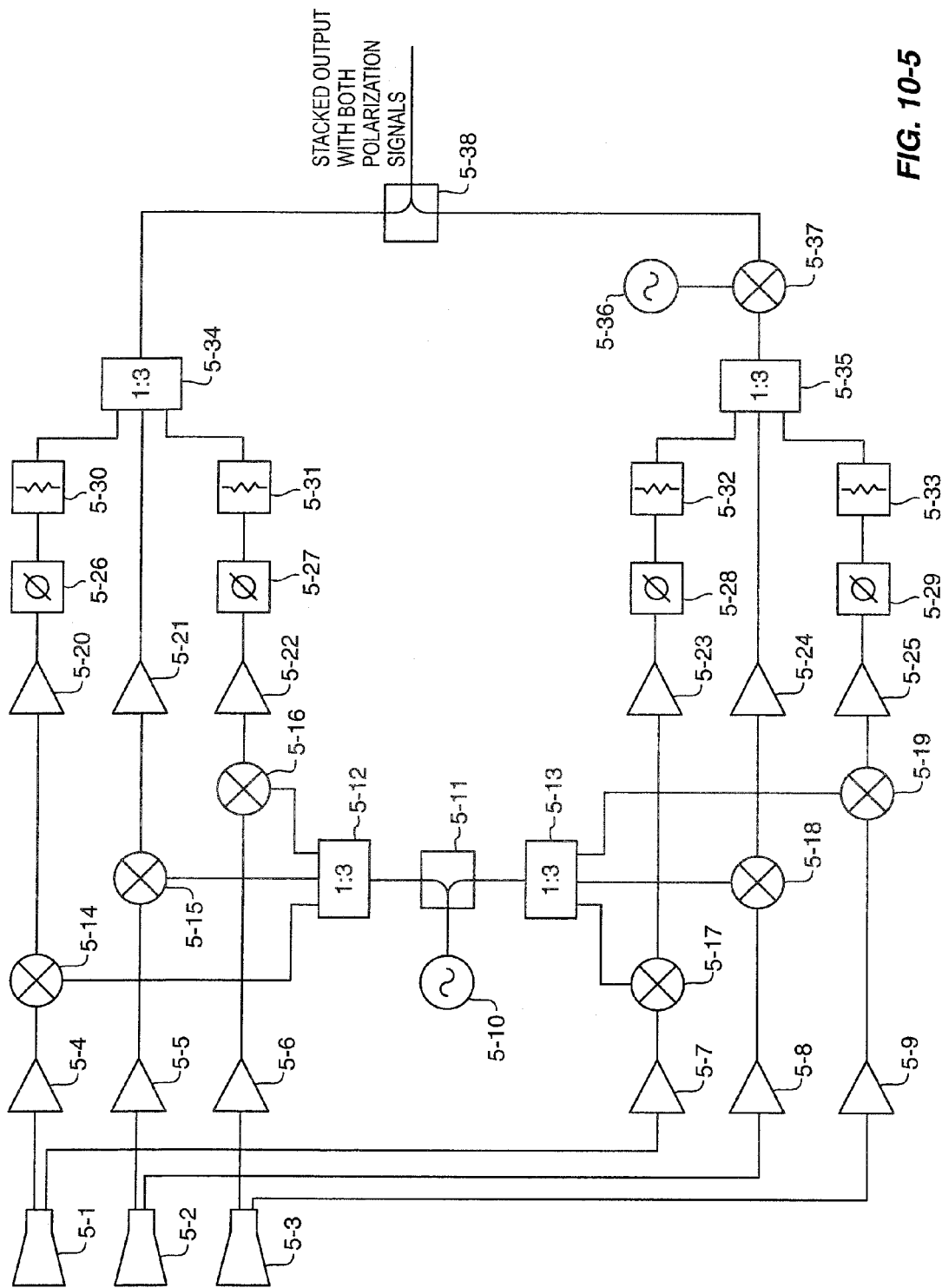
Figures 6, 10:
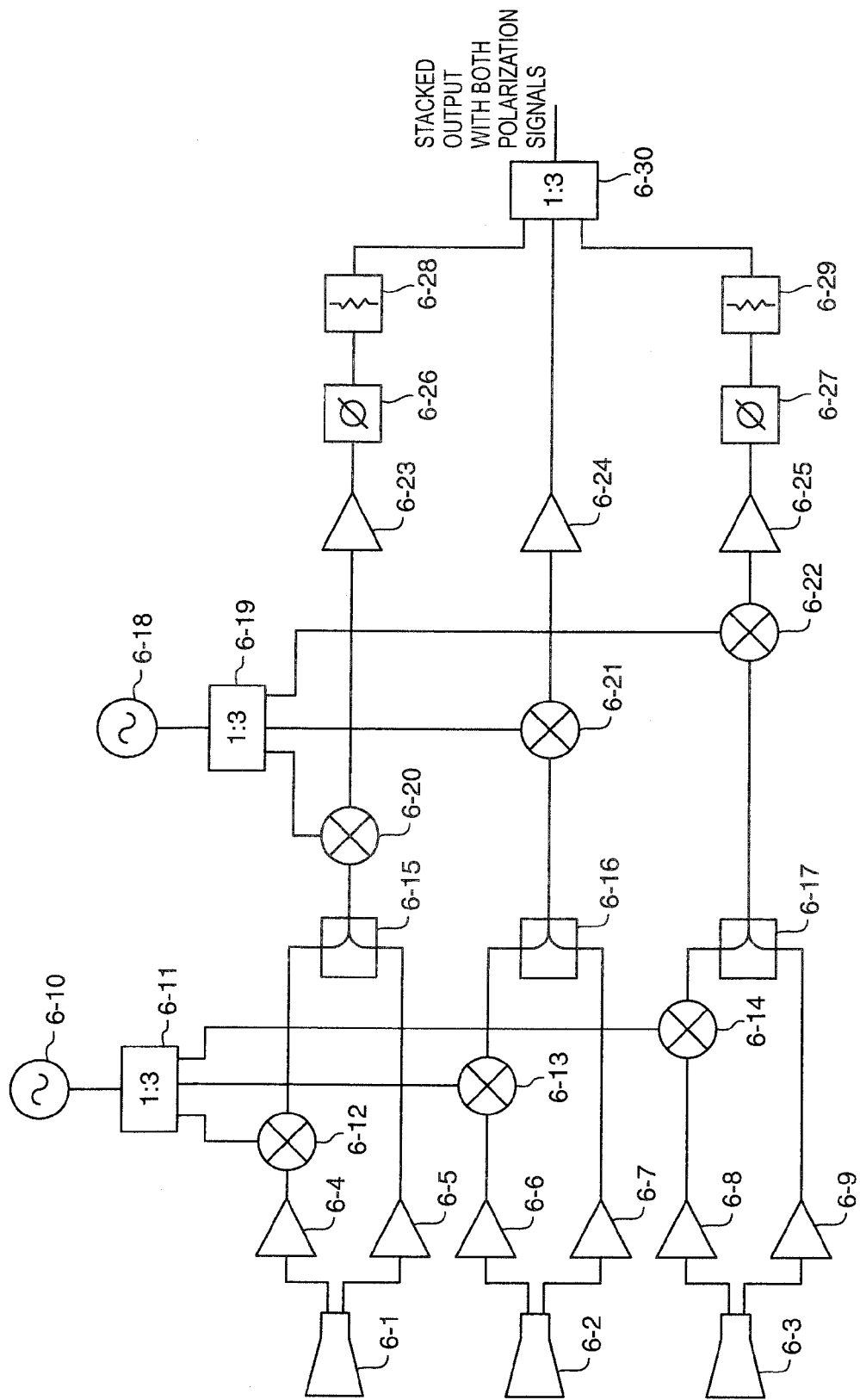

FIG. 1 is a simplified diagram showing a geosynchronous satellite communications network. In FIG. 1, a geosynchronous satellite 3 orbits the earth 5 in an orbit 7 about the equator. The orbit is at about 22,282 miles from the earth. Ground station antennas 9-1, 9-2, 9-3 on the earth transmit and receive communication signals 11-1, 11-2, 11-3 with antennas 13-1, 13-2 on the satellite. The satellite may also have solar panels 15 to provide power to the satellite and a body 17 that contains electronics, thrusters and other components. The signals received from the ground stations are received at the satellite antennas and transmitted back to the ground stations. In many systems, the received signals are amplified and frequency shifted by the satellite before being transmitted (bent pipe model). The satellite may work on a bent pipe model or employ any of a variety of different switching, processing, modulation, and spot beam technologies.

In a BSS system, a few uplink centers will transmit signals to the satellite. These signals are normally DBS television programming, although BSS services may be used for other types of signals. The satellite will frequency shift the uplink signals and broadcast them to millions of subscriber antennas on the earth. In a typical DBS system, the subscriber antennas do not transmit. These are sometimes referred to as TVRO (Television Receive Only) antennas. However, two-way DBS antennas may also be used. TVRO antennas may also be built for FSS and for C-band services. In a two-way FSS system, hundreds or thousands of ground station antennas transmit signals to and receive signals from each other through the satellite. The signals may be directed to a single receiver, multi-cast to specific receivers or broadcast to hundreds, thousands or millions of receivers. Two-way communication is also possible with BSS systems.

The characteristics of typical BSS and FSS systems are described here to aid in understanding the invention. The specific nature of BSS and FSS services are determined by market demand and regulation and may be changed over time as different markets and technologies develop. While the present invention is described in the context of BSS and FSS services, for which it is well-suited, it may be applied to many other types of services. The present invention requires no particular type of licensing regulations and no particular frequency allocation.

Figure 2:
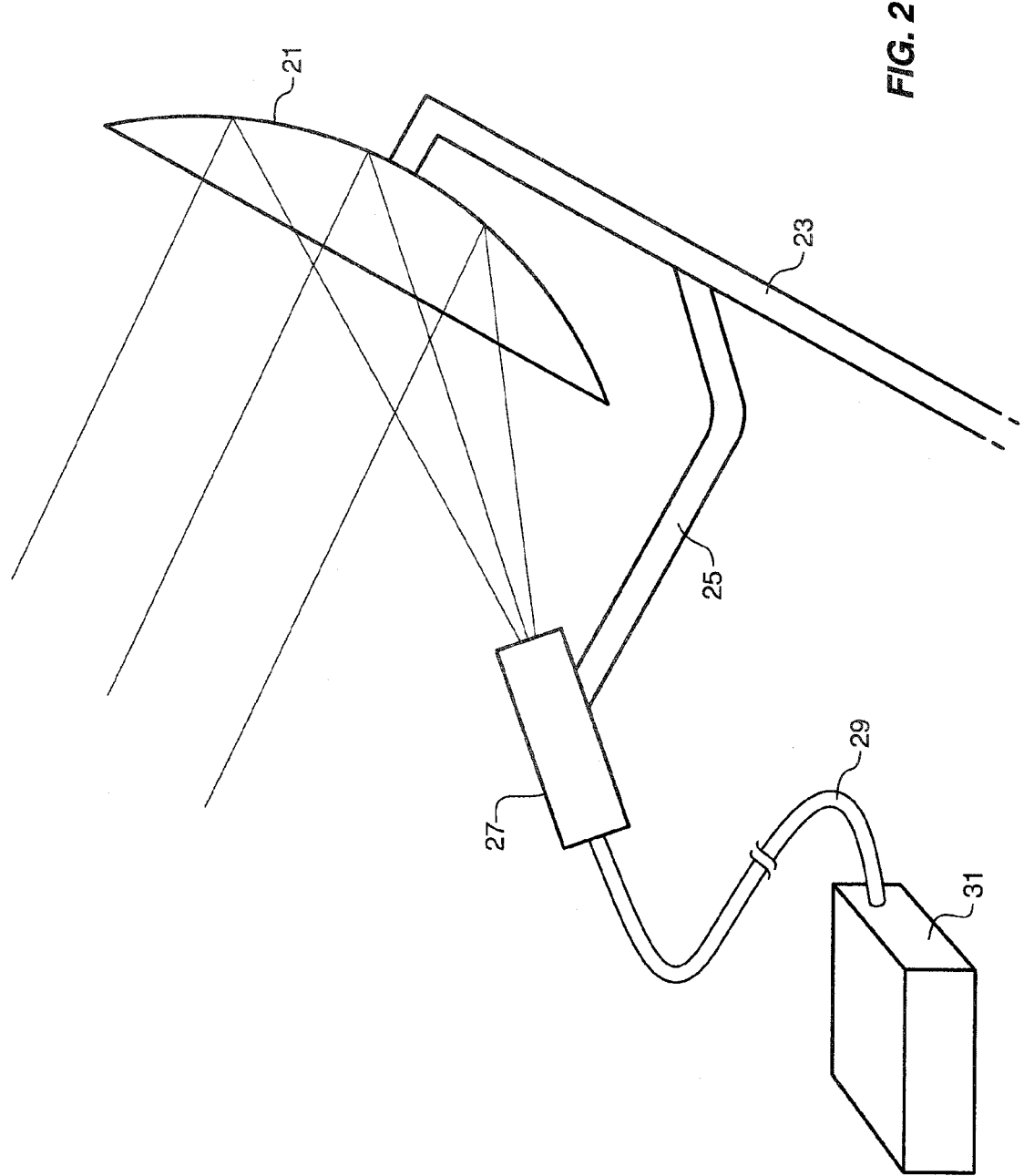
FIG. 2 is a diagram of a satellite ground station antenna with a parabolic reflector and a LNBF that may be used with an embodiment of the invention.

FIG. 2 is a diagram of a satellite ground station antenna that may be used as at least some of the ground stations 9 of FIG. 1. The antenna has a parabolic dish reflector 21 mounted on a support stand 23. The dish reflector may be round, elliptical, or any of a variety of other shapes. The size of the dish will depend upon the application. The support stand also carries a support arm 25 that carries an LNBF (Low Noise Block down-converter and Feed) 27, also referred to as an LNB (Low Noise Block down-converter). The arm may carry one or more LNBF's depending on the application. The reflector or dish collects signals received from a satellite and focuses the energy into the feed of the LNBF. The system also may operate in reverse so that signals from the LNBF are directed at the dish, which reflects them toward the satellite antenna.

As shown in FIG. 2, the LNBF is offset from the center of the reflector dish. This keeps the LNBF out from between the dish and the satellite. Center feed systems may also be used. In a center feed system, the LNBF or a reflector to the LNBF is mounted at the center of the dish, but displaced outwards toward the satellite. In both cases, the feed horn is placed at the focal point of the reflector. The low noise block down converter of the LNBF filters, down converts, and amplifies the signals and sends them into a cable 29, such as a coaxial cable to be conducted to a receiver 31. The receiver demodulates the signals and performs any other processing necessary for the signals to be used.

In a DBS system, the receiver may decrypt and decompress the signals and modulate them for playback on a television. The receiver may also select from multiple channels and decode text or image data for display on a screen. For a business VSAT system, the receiver may demodulate received signals and modulate and amplify signals for transmission. The receiver may sit as a node on a local area network or be coupled to a node on a local area network and act as a wide area network gateway for the other nodes of the local area network. The receiver may also provide power to the LNBF to drive oscillators and amplifiers.

Figure 3:
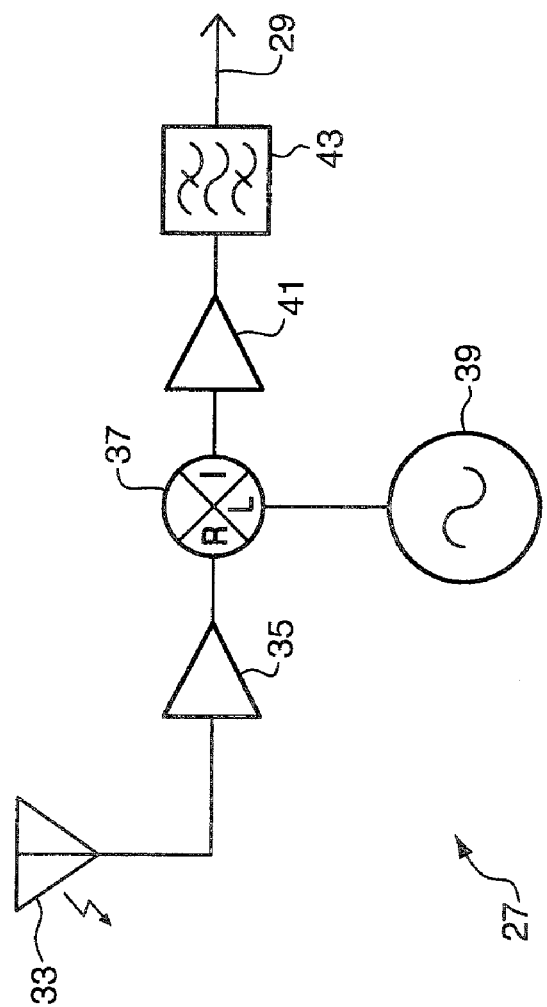
FIG. 3 is a block diagram of a LNBF that my be used for the satellite ground station antenna of FIG. 2.

As shown in FIG. 3, the LNBF 27 receives signals through a feed. The feed is shown as a conical feed horn, however, many other types of feeds may be used. The received signals excite pins or wires (not shown) that are coupled to a low noise amplifier 35. The low noise amplifier amplifies the signals by as much as 60 dB or more and couples the signals to a down converter mixer 37. The mixer receives the amplified satellite signal as radio frequency (RF) energy and combines it with a local oscillator signal 39 to produce an intermediate frequency (IF) signal. The IF signal is amplified in a further amplifier 41, filtered in a band pass filter 43, and fed to a signal cable 29 to a remote receiver 31.

The particular design of FIG. 3 is provided as an example, and many other variations and modifications are possible to adapt to different applications. In addition, while the LNBF is described in the context of receiving, the same or a similar design may also be adapted for transmitting.

Figure 4:
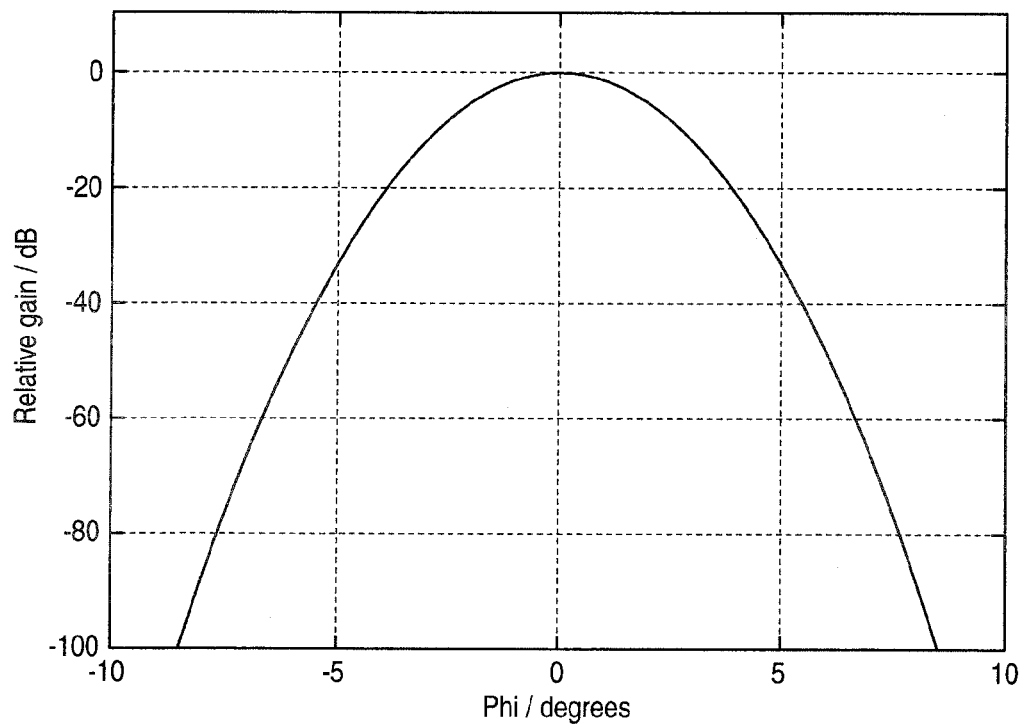
FIG. 4 is a graph of a reception or transmission pattern for a conventional satellite ground station antenna using a parabolic reflector and a feed horn.

FIG. 4 is a graphical representation of signal strength on the vertical axis versus angular direction on the horizontal axis. The graph is based on a transmission pattern for a conventional 60 cm diameter parabolic reflector and LNBF type satellite ground station antenna. The ground station may be similar to that shown in FIGS. 2 and 3, however, a similar result may be obtained for many other types of antennas. Due to reciprocity, this diagram of transmission also applies to receiving a signal from a single satellite positioned at the center of the field of view of the reflector and feed combination. The zero point on the horizontal axis represents the very center of the field of view of the feed and reflector combination. Amplitudes to the left and right represent signals received at distances to the left and right of the center of the antenna's field of view. The horizontal axis is marked in degrees to correspond to satellite angular positions. The vertical scale is marked in decibels and normalized to zero so that amplitude is shown as the difference from the maximum amplitude on a logarithmic scale.

As shown in FIG. 4, the signal shows a Gaussian shape. The amplitude or sensitivity is the highest at the center of the antenna's field of view (zero degrees) and tapers off quickly on either side of the center. In other words, the antenna is the most sensitive to signals aligned with the center of the antenna's field of view. If the antenna is pointed directly at the intended satellite, then the antenna's sensitivity will be at a maximum for signals from that satellite. On the other hand, the diagram of FIG. 4 shows that a source 10 degrees away from the center of the antenna's field of view will be received with very much less gain.

The diagram of FIG. 4 may also be used to characterize the antenna's sensitivity to off-center satellites or satellites in nearby orbital positions. For BSS, the orbital slots are separated by nine degrees. The diagram shows that at nine degrees from the center, the antenna's sensitivity is off the chart. With 100 dB attenuation, the signal from the neighboring satellite will be well below the level of other noise sources. With FSS and BSS systems, the received signals are typically only about 20 dB above the noise floor. Accordingly, any signal beyond about 3.8 degrees will fade into the noise.

For FSS, however, the satellites are spaced only two degrees apart. At two degrees offset, the amplitude is −5.5 dB or reduced to 50% of the maximum. Such a signal is still received and can interfere significantly with a signal from the satellite at zero degrees offset. At four degrees offset the amplitude is attenuated 22 dB or a mere 8% of the maximum sensitivity. The four degree offset signals are accordingly unlikely to create much interference with the central signal. Accordingly, if three satellites with two degrees spacing are transmitting to the 60 cm antenna with equal power, the carrier to interference (C/I) ratio would be 2.5 dB in the center of the received pattern.

The diagram of FIG. 4 has been generated based on a perfectly shaped parabolic reflector that is aimed perfectly at a satellite at zero degrees. The calculations of attenuation for satellites at two and four degrees are also assumed to be in exactly the correct positions and all the satellites are assumed to be aligned directly over the earth's equator. If the satellites are drifting north, south, east or west in their orbits and if the reflector is not pointed perfectly or is in some way bent or imperfectly manufactured, then the shape of the curve will change. In addition, it should be noted that both the satellite and the ground station typically transmit signals with a shape similar to that of FIG. 4 with a central maximum intensity that falls off with distance from the center. So, for example, some portion of the signal from the satellite with the two degree offset overlaps the zero degree and maximum sensitivity portion of the ground station antenna.

As can be seen from FIG. 4, the 60 cm dish is a good choice for receiving signals from a satellite at zero degrees and rejecting signals from satellites with nine degree orbital slot spacing from the center. It is less effective for satellites with a two degree or four degree spacing. The relation that smaller antennas have wider beams is a fundamental geometric property of a parabolic reflector. The approximate angular half-width for an antenna is given by $\theta = \lambda/(2\,d)$, where $\theta$ is the angular half-width of the transmitted or received beam in radians, $\lambda$ is the wavelength of the signals incident on the parabolic reflector, and $d$ is the diameter of the reflector. Signals from neighboring satellites may easily be eliminated by increasing the diameter of the dish. The 120 cm dish commonly used in FSS systems has a narrower signal beam and does not suffer from interference from satellites two degrees away.

Figure 7:
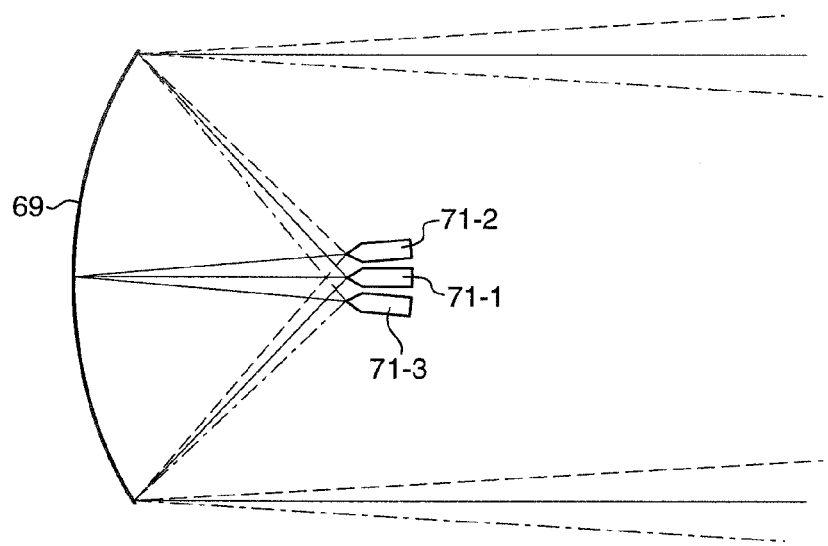
FIG. 7 is a diagram of a satellite ground station antenna with additional feed horns to generate nulls according to an embodiment of the invention.
Figure 8:
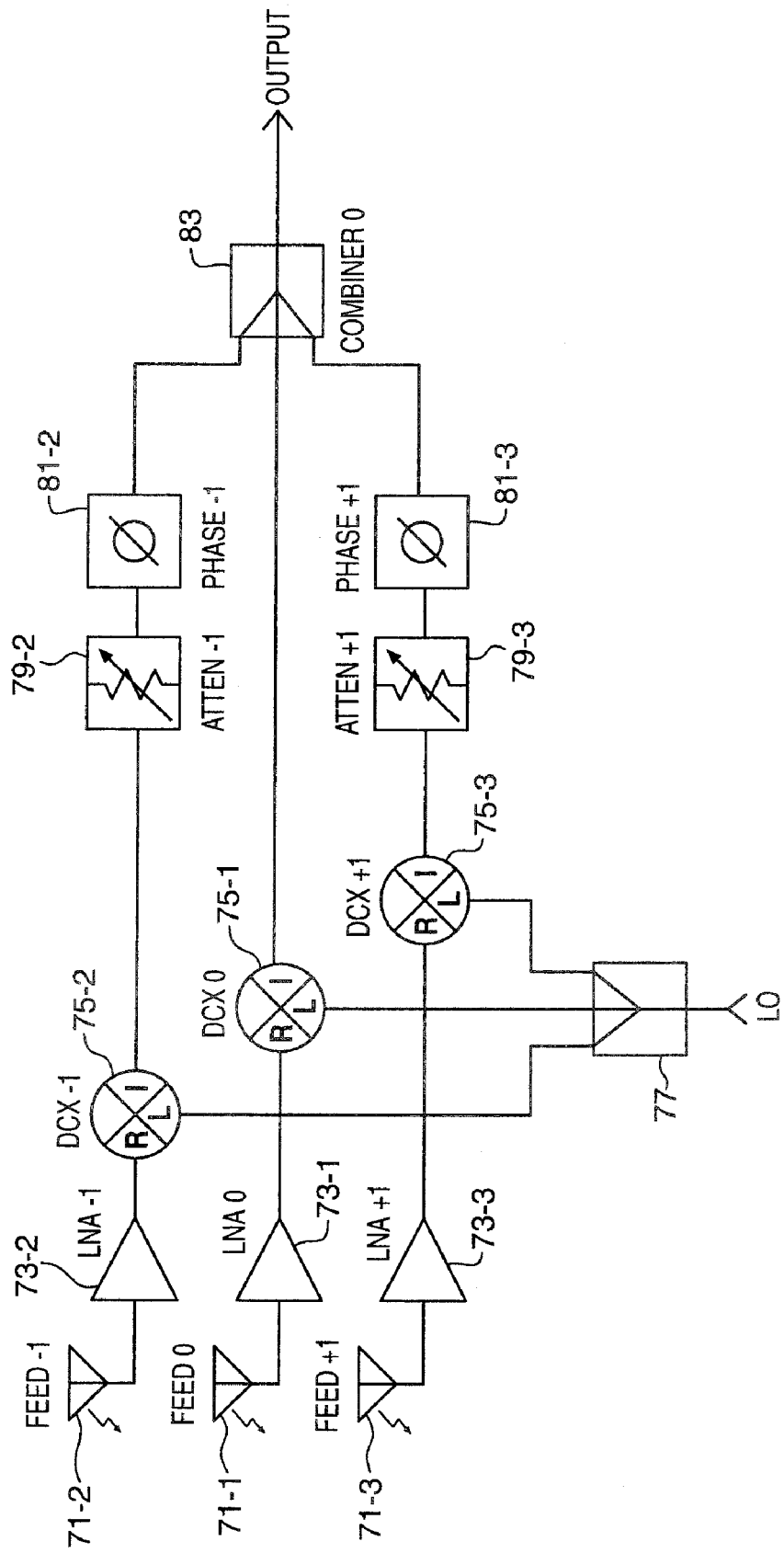
FIG. 8 is a block diagram of a combined LNB for the three feed horns of FIG. 7.
Figure 9:
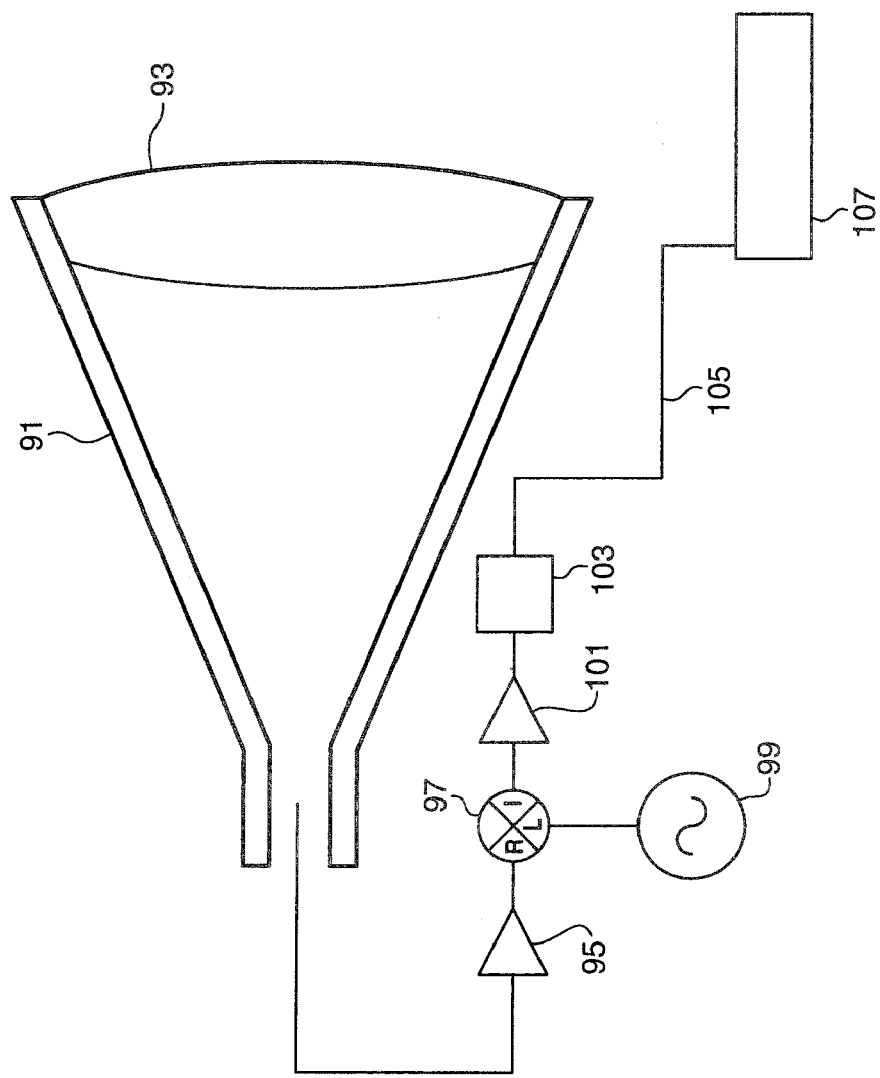
FIG. 9 is a diagram of a satellite ground station antenna LNBF including a lens to generate nulls according to an embodiment of the invention.

While a larger dish allows interference from neighboring satellites to be reduced, smaller dishes are less expensive to build, ship and install and greatly preferred for aesthetic reasons. The wide distribution of the received or transmitted signal of a smaller dish may be compensated by generating nulls in the antenna pattern at the positions of any interfering adjacent satellites. Nulls may be generated in a variety of different ways. In the example of FIGS. 7 and 8, additional feed horns are added. In the example of FIG. 9, a lens is added to the feed horn. Alternatively, the feed can be redesigned to couple energy into some additional waveguide modes. As a further alternative digital signal processing may by applied to baseband signals. The particular choice may depend upon the application, including signal frequency, the types of nulls desired, cost and form factor restrictions.

For the example of FIG. 3, nulls may be generated at the two degree and even the four degree positions on either side of the center of the reception maximum. The nulls eliminate much of the signal received from satellites in those positions. This may avoid any requirement that the antenna beam be narrow enough to avoid receiving signals from the adjacent satellites. As a result, a smaller antenna reflector or dish may be used than might otherwise be required. Antennas are described herein in the context of FSS communications with 120 cm dishes and two degrees between orbital slots and BSS communications with 60 cm dishes and nine degrees between orbital slots. However, embodiments of the present invention may be applied to many different communications systems and many different antenna sizes and orbital slot requirements.

When nulls are introduced at the positions of the first adjacent satellites, for example at two degrees, the main beam may be broadened. The antenna pattern may become broad enough that interference from the second adjacent satellites, for example at four degrees, may become a problem. However, additional nulls may be added at the second-adjacent positions. Additional nulls may be added at any position as desired to achieve any target C/I ratio.

Figure 5:
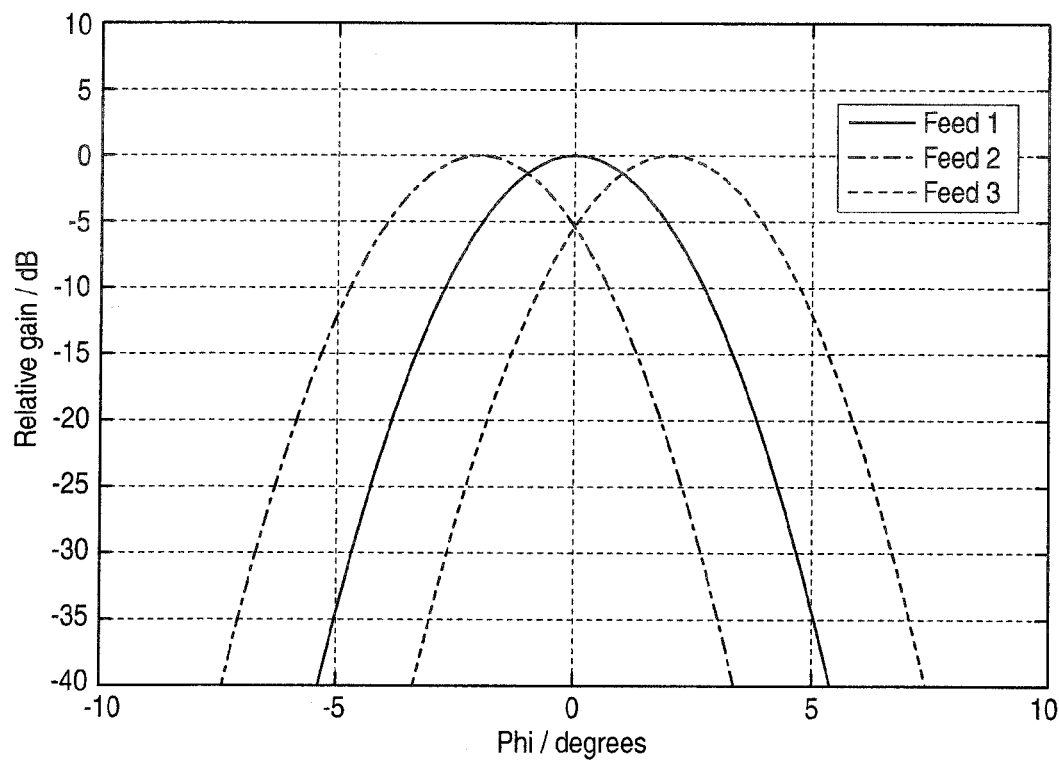
FIG. 5 is a graph of the reception or transmission pattern of FIG. 4 with additional reception or transmission patterns added at plus and minus two degrees according to an embodiment of the invention.

FIG. 5 shows the waveform of FIG. 4 together with two additional, identical waveforms displaced two degrees on either side of the main central waveform of FIG. 4. These waveforms can be generated in many different ways and can be used to generate nulls. For example, the two additional waveforms may be generated each by an additional LNBF displaced from the central LNBF. The two additional waveforms have maximum sensitivity at two degrees from the center, which, in the example of FSS communications corresponds to the signals from the two closest interfering satellites. As shown, the waveforms are identical in magnitude and shape to the central waveform, however, other shapes may also be generated using a variety of different techniques.

Figure 6:
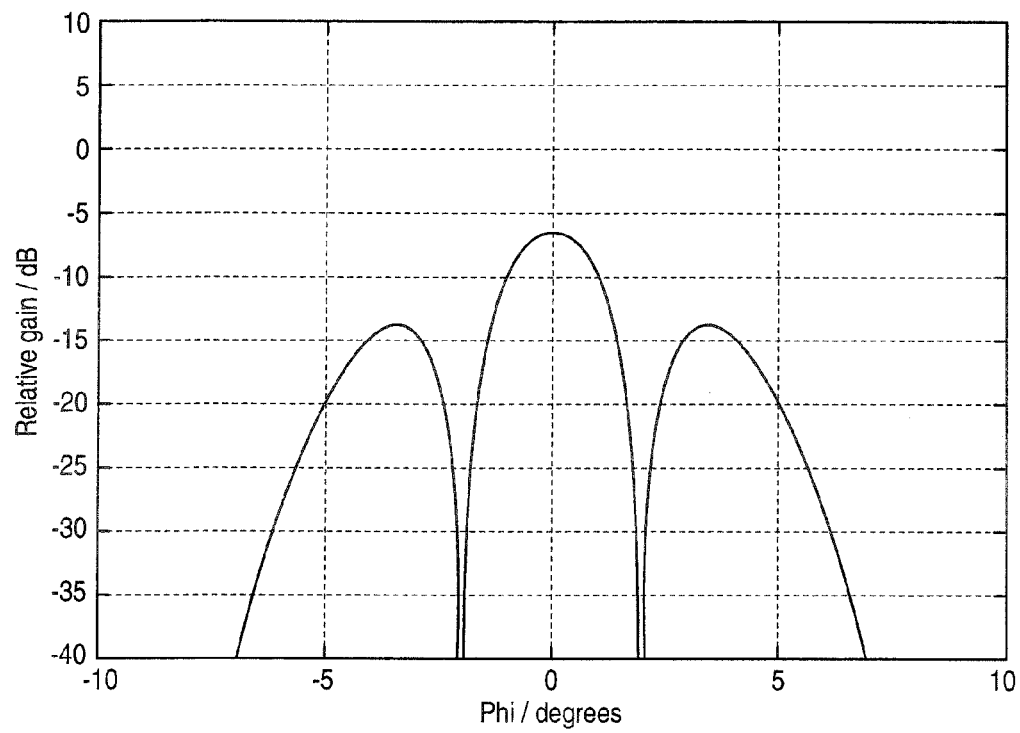
FIG. 6 is a graph of the sum of the curves of FIG. 5 showing resultant reception or transmission patterns according to an embodiment of the invention.

In FIG. 6, the waveforms of the three feeds in FIG. 5 are combined. The two side signals are scaled down or attenuated and then subtracted from the signal from the center feed. This yields a transmission and reception pattern with deep nulls at two degrees. These deep nulls are aligned with the neighboring FSS satellite beams. There are also corresponding peaks near four degrees corresponding to the next nearest FSS satellites. However, these are much weaker and may normally be ignored. In addition, for some systems, there may not be any satellites using the same frequencies at the four degree offset positions.

The graphs of the figures of the present invention show only two dimensions, while the reception and transmission patterns are three dimensional. Two dimensions are shown to simplify the drawings. For a geosynchronous satellite application, all of the satellites are aligned roughly with the equator and so the interfering satellites are all aligned along the same dimension. In other words, when pointing a ground station antenna, there may be interfering satellites to the east and west of the intended satellite, but there will not be any interfering geosynchronous satellites to the north or south. As a result, interference from neighboring satellites can be mitigated by adding nulls only in the east/west dimension. This has an additional benefit in that there need not be any reduction in the signal in the other direction, orthogonal to the neighboring satellites. This direction is not shown in the Figures.

One way to add nulls to a reception or transmission pattern is to add feed horns. FIG. 7 shows a parabolic reflector 69 similar to the reflector 21 of FIG. 2 with three feed horns 71.1, 71-2, 71-3. The view of FIG. 7 is a top view as compared to the side view of FIG. 2. The side view for the apparatus of FIG. 7 would be very similar to FIG. 2. The center feed horn 71-1 is positioned in substantially the same position as the feed horn of FIG. 2 and illuminates the entire dish evenly from the dish's focal point. The two additional feed horns are displaced laterally from the dish's focal point. The lateral displacement corresponds to a distance of two degrees to the east and two degrees to the west. They each are directed at the center of the dish as shown by the centerlines emanating from the front of each feed horn. However, due to their displacement, while they illuminate the entire dish, the beams reflected from the dish are angularly offset from that of the central feed horn. The amount of offset can be adjusted to accommodate the position of any interfering satellite by adjusting the distance between the feed horns. Additional feed horns may be added at positions corresponding to four degrees or any other position.

By adding feeds to the left and right of center, two additional reception and transmission patterns are created. If the feeds are identical to the center feed then two very similar reception or transmission patterns will be added to the first one. An idealized representation of this group of three patterns is shown in FIG. 5. Each pattern shows the same maximum amplitude on the vertical axis and the same width across the horizontal axis. While two identical feeds of equal size to the original feed is shown, smaller or larger feeds may also be used.

An example treatment of the signals from the three feed horns of FIG. 7 is shown in FIG. 8. As shown in FIG. 8, the three feed horns 71-1, 71-2, 71-3 are each coupled to a LNA (Low Noise Amplifier) 73-1, 73-2, 73-3 and then each to a mixer 75-1, 75-2, 75-3 to down convert the signal from its received radio frequency to an intermediate frequency band that can be conveyed through conventional coaxial cable or some other transmission medium. The mixers are coupled to a common local oscillator 77 so that the relative phase relationship between the signals is maintained.

The outer two signals are next fed each to an attenuator 79-2, 79-3 and then each to a 180 degrees phase shifter 81-2, 81-3 before the signals are combined. This allows the nulls to be reduced and the phase to be inverted before all three signals are mixed in a combiner 83. By adjusting the amount of attenuation, the position of the nulls can be adjusted. As shown in FIG. 6, the nulls may also attenuate the maximum for the central feed horn, reducing the gain for the target satellite. By adjusting the nulls, the amount of attenuation of the central feed signal may also be adjusted. The amount of attenuation will vary depending on the application. The phase shifters allow the side signals to be shifted 180 degrees out of phase with the main feed so that when combined, these signals will subtract from the main signal.

The amount of attenuation and phase shift may be provided by fixed passive components or by adjustable gain stages and adjustable phase shifters. Adjustable components may allow for calibration of the gain and phase to compensate for differences in the feed horn positions, the feed horn geometry, the LNA's and the mixers. Alternatively, the phase shifting and attenuation may be performed using feed horn design or hybrid waveguide principles instead of the electrical IF configuration shown. The particular design of the circuit of FIG. 8 may also be modified to suit a particular application. For example, the phase shifters and attenuators may be placed before the down converters or the amplifiers. The phase shifters may be combined with the mixers. For higher frequencies, such as Ku-band or Ka-band down conversion may be used to lower the cost of the electronic components but for lower frequency satellite signals, down conversion may not be necessary or desired. Alternatively, with other components, the operations of FIG. 8 may be applied to the radio frequency signals directly.

In FIG. 9, nulls are added for undesired signals using a lens 93 with an engineered shape. The lens may be introduced at any position between the reflector dish and the feed horn. In the example of FIG. 9, the lens is placed at the outer opening of the feed horn 91. However it may be placed outside of the feed horn or deep into the feed horn's throat. This lens may be fabricated out of any of a variety of different low-loss microwave dielectric materials, for example polytetrafluoroethylene, polyethylene, or fused silica. The choice of materials will depend upon the frequencies of the signals, as well as cost and environmental conditions. The particular shape of the lens may be adapted to attenuate signals from different interferers in different positions and two or more interferers may be compensated.

The RF energy received by the feed horn 91 is optimized by the lens and feed horn combination for the particular pattern of satellites from which signals are received. The lens modifies the modes from the feed horn to correspond to the modes of the three separate feed horns described with respect to FIGS. 5 and 6. FIG. 9 shows the feed horn and lens in cross section and in one embodiment, both elements have rotational symmetry so that the cross section appears the same no matter where it is taken. In another embodiment, the lens generates nulls only in the horizontal direction, corresponding to east and west, but not in a vertical direction corresponding to north and south. Accordingly, FIG. 9 corresponds to a vertical cross section and not to a horizontal cross section.

As further shown in FIG. 9, from a pickup in the feed horn, the received signal is then amplified in a low noise amplifier 95. The amplified signal is down converted to an IF band in a mixer 97 using a signal from a local oscillator 99. The IF signal is then amplified further in a further LNA 101, filtered in a band pass filter 103 and transmitted in a guide or cable 105 to a receiver 107.

As another alternative, the feed horn may be modified to excite modes that correspond to the three separate feed horns described with respect to FIGS. 5 and 6. These modes may be generated and combined within the feed horn or separate apparatus may be provided to extract and combine the modes outside the feed horn. For an electromagnetic wave, the polarization is a function of the direction of the electric field over a full cycle of the wave. In general, the electric field will produce an ellipse in the plane perpendicular to the direction of propagation of the wave. If the major and minor axes of the ellipse are equal, the polarization is circular. Circularly polarized waves can be either left-hand circular or right-hand circular, depending on whether the electric field rotates clockwise or counter-clockwise when viewed along the direction of propagation. If the minor axis is zero, the polarization is linear. The major axis of linear polarization may be at any angle, but it is called vertical polarization if it is parallel to the direction of gravity, and called horizontal polarization if it is perpendicular to the direction of gravity.

Geosynchronous communications satellites generally use two orthogonal polarizations. Alternating transponders typically have alternating polarizations. An earth receiving station that is always tuned to a particular transponder only needs to receive signals with one polarization, but a receiving station that can be tuned to one or more alternate transponder needs to be able to receive the alternate polarization. Current DBS receiver systems receive both polarizations using a dual-polarization feed and two low noise block-downconverters, one for each polarization. In some systems, a control voltage switches the polarization signal that is sent over a cable to the receiver. This is adequate for a single receiver system. For a system with two receivers and a single LNBF, both polarization signals may be required if the two receivers are each tuned to channels on different transponders. To support this, some LNBFs have two outputs. Three receivers can be supported with two outputs by sending one polarization signal on each output and sending both outputs to all receivers, or by sending both outputs to a switch that sends the appropriate signal to each receiver. Some systems combine these two outputs by frequency-shifting one so that they can be sent over just one cable. This is sometimes referred to as 'stacking'.

For the United States, the Ku-band FSS downlink signals are between 11700 and 12200 MHz. The Ku-band BSS downlink signals are between 12200 and 12700 MHz. FSS signals are usually linearly polarized and BSS signals are usually circularly polarized. This features present some obstacle to simultaneously receiving signals from a FSS and a BSS satellite which are in the same or nearly the same orbital position. Simultaneous reception from a single reflector would seem to require that the FSS and BSS feed assemblies be in the same or nearly the same physical location. One way to provide the two feed assemblies in the same location is to use a single wideband feed to receive both the FSS and the BSS signal. However, it is difficult or expensive to have a common feed and use a diplexer filter to send each band to a separate dual-polarization feed and low noise amplifier. Because these two bands are contiguous in frequency, the diplexer's transition would need to be impractically sharp. In addition, it is difficult to sustain the two different types of polarization modes.

As shown in FIG. 10-1, a single LNBF may be used for both the FSS and the BSS signal by receiving one orthogonal pair of polarizations, such as horizontal and vertical, and electronically synthesizing the other pair of orthogonal polarizations, such as right-hand circular and left-hand circular. As described below, the process may also be reversed so that circular polarizations are received and linear polarizations are synthesized. The approach of FIG. 10-1 is effective even when some of the received signals are linearly polarized and others are circularly polarized.

In FIG. 10-1, a dual-polarization feed 1-1 receives satellite transmissions from a parabolic reflector or some other concentrating device. The feed is coupled to low-noise amplifiers 1-2, 1-3 to provide, for example, a vertically polarized signal to a first low-noise amplifier 1-2 and a horizontally polarized signal to a second low-noise amplifier 1-3. A local oscillator 1-4 feeds an intermediate frequency (IF) waveform to a splitter 1-5 which supplies the waveform to mixers 1-6 and 1-7. The mixers combine the local oscillator signal with the signal from the low-noise amplifiers to downconvert the received signals. The downconverted signals are passed to further amplifiers 1-8 and 1-9, and then to splitters 1-10 and 1-11. One output from each splitter provides the linear polarization outputs, for example horizontal and vertical polarization, respectively. The other two outputs from the splitters 1-10 and 1-11 may be combined in a quadrature hybrid 1-12 to form the two circular polarization outputs, for example left-hand and right-hand.

The quadrature hybrid or final combiner 1-12 may introduce a 90° phase shift between the horizontal and vertical signals or this phase shift may be introduced at the local oscillator splitter 1-5. The resulting phase shift between the two linear outputs would have no effect on demodulating the received signal.

In the example of FIG. 10-2, the two orthogonal feeds are circularly polarized, and the linear polarizations are electronically synthesized. A dual-polarization feed 2-1 provides the left-hand circular polarization signal to a first connected low-noise amplifier 2-2 and provides the right-hand circular polarization signal to a second connected low-noise amplifier 2-3. A local oscillator 2-4, generates an local oscillator waveform that is fed to a splitter 2-5, and then to two mixers 2-6 and 2-7. Each mixer receives one of the polarization signals and downconverts the respective received signal. The downconverted signals are each fed to an amplifier 2-8 and 2-9, and from the amplifiers are each fed to a respective splitter 2-10 and 2-11. One output from each splitter provides the circular polarization outputs. The other output from each splitter 2-10 and 2-11 is fed to the same 180° hybrid 2-12 to be combined to form the two linear polarization outputs.

In the example of FIG. 10-3, a dual-polarization feed receives a satellite signal and provides any two signals of nearly-orthogonal polarizations. These signals may be horizontal and vertical linear polarizations or orthogonal circular polarizations. Alternatively they may be any other pair of orthogonal or nearly orthogonal polarizations and may not be linear or circular. In this example, based on the two signals from the feed, both pairs of polarizations, horizontal and vertical linear and right and left circular, may be electronically synthesized. If desired, other polarizations may also or alternatively be synthesized. Pure linearly or circularly polarized outputs are not required.

In FIG. 10-3, a dual polarization feed 3-1 receives a satellite signal from a parabolic dish or other source as in FIGS. 10-1 and 10-2. It provides one polarization signal to a first low-noise amplifier 3-2 and the other polarization signal to a second low-noise amplifier 3-3. The LNA provide their respective signals to respective mixers 3-6, 3-7. A local oscillator 3-4 generates an LO waveform and feeds it to a splitter 3-5 that supplies a copy of the waveform to each of the mixers 3-6 and 3-7. The mixers downconvert the received signals and supply them to respective amplifiers 3-8, 3-9. The downconverted signals are further amplified by the amplifiers 3-8 and 3-9, and then each split by respective four-way splitters 3-10 and 3-11.

The four outputs of one of the splitters are each fed into a respective attenuator 3-16, 3-18, 3-20, 3-22. The four outputs from the other one of the splitters are each fed first to an adjustable phase shifter 3-12, 3-13, 3-14, 3-15 and from each phase shifter into an adjustable attenuator 3-17, 3-19, 3-21, 3-23. The outputs of the attenuators are coupled to combiners 3-24, 3-25, 3-26, 3-27. Each combiner receives one input from each of the two splitters, so that one input is phase shifted and the other is not. Alternatively, another set of phase shifters may be used so that every splitter output is fed to a phase shifter before it is applied to an attenuator. In addition all of the attenuators may be adjustable. The phase shifters 3-12 thru 3-15 and attenuators 3-16 thru 3-23 adjust the amplitudes and phases to produce any desired synthesized polarizations at the outputs of combiners 3-24 thru 3-27.

For some embodiments, the attenuators may be incorporated into the combiners that follow them by using unequal power combiners. As a further alternative, the phase shifters may be moved to any location upstream of the corresponding splitter. The phase shifters and attenuators may be fixed in order to obtain a specific fixed set of polarization outputs or they may be adjustable manually or electrically to obtain different outputs at different times.

Any satellite downlink or uplink communication signal may suffer distortions, interference and perturbation in the long path between the satellite and the receiver as well as in the feed horn. One such distortion is cross-polarization distortion or cross-polarization interference. This occurs when two orthogonal polarization modes are disturbed and then interact with each other. Cross-polarization distortion may be caused in the receiver when one of the polarization modes is not perfectly rejected in a polarization feed. Cross-polarization distortion may also be caused by using a reflector off-axis, that is using a reflector or satellite dish that is not pointed directly at a satellite. This may be because the reflector is not aimed properly or because the reflector is aimed at a position between two satellites in order to receive signals from both satellites with a single reflector. Precipitation, such as rain, between the antenna and the satellite may also cause cross-polarization distortion.

By receiving both polarizations, that is any two orthogonal polarizations whether linear or circular, simultaneously and combining them, the interference due to cross-polarization may be canceled. Using this cancellation approach, the example receiver in FIG. 10-3 can be adjusted to produce signals free of cross-polarization distortion. Alternatively, the example system of FIG. 10-4 may be used. In the example of FIG. 10-4, two nearly-orthogonal polarizations with cross-polarization interference are received and two outputs are produced with the interference removed. The outputs may be orthogonal or not depending on the settings of the various components.

In FIG. 10-4, two nearly-orthogonal or orthogonal signals are received. The two signals may be horizontally and vertically polarized respectively or right-hand and left-hand circularly polarized, respectively or any other nearly-orthogonal pair of modes. One copy of each signal is fed directly to a respective combiner 4-5, 4-6. A second copy of each signal is fed first to a respective adjustable phase shifter 4-1, 4-2 and from the phase shifter to a respective adjustable attenuator 4-3, 4-4. The signals from the attenuators are each fed to one of the combiners 4-5, 4-6 so that each combiner receives an unmodified version of one signal and a phase shifted attenuated version of the orthogonal signal The phase shifters 4-1, 4-2 operate to apply an inverted copy of the unwanted distortions to the combiners 4-5 and 4-6. The inverted copy cancels the distortions and produce outputs free of cross-polarization distortion. The combiners produce an output with orthogonal modes similar to the originally received signals but free of the cross-polarization distortion.

The attenuator and phase shifter settings which generate the correct amplitude and phase to cancel the cross-polarization distortion may be made in a variety of different ways. One way of making the settings is to measures any distortions inherent in the design of the transmitting and receiving antenna systems. These distortions may be measured in a laboratory or a production facility and phase settings may be determined which correct only the measured cross-polarization distortion. Because this part of the distortion is fixed, the correction settings in the phase shifters may also be fixed.

Cross-polarization distortion due to misaligned antennas and rain fade may vary over time and therefore may not be correctable using a fixed setting. Distortion from these sources may be corrected while the system is operating. Another way to correct for cross-polarization distortions is to measure and minimize the power of an alignment signal on the undesired polarization at the output to be controlled. This signal may be one which is already present in the systems described above, or it may be one which is added for this purpose. The alignment signal may be a continuous wave signal, a spread spectrum signal, or a signal with some other modulation.

With the proper choice of modulation, it is possible to measure the power of the alignment signal even though it is weak compared to the power of the signals on the desired polarization. Alternatively, a signal which is not as easily measurable in the presence of other signals may be used as long as it is on a frequency at which the desired polarization has little or no signal power. The power of this signal is directly proportional to the amount of cross-polarization distortion, so it will be at a minimum when the cross-polarization is at a minimum.

Another way is to measure the signal-to-noise ratio at a receiver driven by the output to be controlled. Cross-polarization distortion adds interference to the output signal, which degrades the signal-to-noise ratio. When the signal-to-noise ratio has been maximized, the distortion has been minimized. The digital satellite signal demodulators commonly used for digital video broadcasting (DBS) usually report on the amount of noise in their input signal. This value may be applied to phase adjustment loop that adjusts the phase as the noise value is monitored.

Another way is based on the fact that in the absence of cross-polarization distortion, the orthogonal polarizations will have a minimum cross-correlation. This can be used to determine the optimum settings to null the distortion. One way to measure the cross-correlation of two signals is to combine them in a mixer. The zero-frequency output of the mixer will then be a measure of the cross-correlation. If the mixer inputs are the outputs of, for example combiners 4-5 and 4-6 in FIG. 10-4, then the filtered output of the mixer will measure the cross-polarization distortion.

These and many other approaches may also be applied to signals before they are transmitted to or by a satellite to correct for cross-polarization distortion in the transmitting antenna, the receiving antenna, or both the transmitting and receiving antennas. In this case, unless the first approach described above is used, it is necessary to convey the results of the cross-polarization detection to the transmitter. This may be done using an uplink capability in the satellite ground receiver. If the ground receiver is a receive-only receiver as is common in DBS applications, the information can be sent back to the transmitter over a terrestrial link, such as a phone line or computer network. Alternatively, the cross-polarization distortion level may be estimated by using a reference receiver at the transmitter which is similar to the remote receiver.

In order to distribute signals with two different polarizations simultaneously from one LNBF to one or more electronic receivers without using two cables, one for each of the two orthogonal polarization modes, it is common to 'stack' the two polarizations. Accordingly a horizontal linear and a vertical linear polarization mode will be stacked into one cable or a left-circular and a right-circular polarization mode will be stacked in one cable. In a typical stacked system, one polarization signal is frequency-shifted up by some amount, often 575 MHz, and combined with the other un-shifted polarization signal. Thus in a typical DBS system, the signals from one polarization are found between 950 and 1450 MHz, and the signals from the other polarization are found between 1550 and 2050 MHz.

FIG. 10-5 illustrates an example of a three-element interference canceling system for adjacent-satellite interference cancellation with polarization stacking. Three dual-polarizations feeds, 5-1, 5-2, 5-3, receive a signal from a signal parabolic dish or similar source. They each have two outputs one for each of the two orthogonal polarization modes that they are designed to receive. Each feed provides one polarization mode signal one a respective one of three low-noise amplifiers 5-4, 5-5, 5-6. The other polarization modes signal is applied to a respective one of another set of three low-noise amplifiers 5-7, 5-8, 5-9.

All six amplified signals are then downconverted. In this example, a local oscillator 5-10, is coupled to a two-way splitter 5-11 and the two splitter outputs are each coupled to a three-way splitter 5-12, 5-13 to provide a local oscillator signal to six mixers. There are three mixers 5-14, 5-15, 5-16 for the first polarization and three mixers 5-17, 5-18, 5-19 for the other polarization. The mixers downconvert the signals, which are then each amplified by a respective amplifier 5-20 thru 5-25. The downconverted amplified signals are then applied to combiners.

The downconverted, amplified, first polarization signals from two of the feeds are each applied to a phase shifter 5-26, 5-27 and then to a respective attenuator 5-30, 5-31. The signals from all three feeds are then combined in a combiner 5-34. The phase shifters and attenuators adjust the amplitude and phase of the signals from the feeds centered on the first-adjacent satellites so that they cancel any interference present on the center feed. The signals from the three feeds are combined by combiner 5-34 to produce a signal for the first polarization. The downconverted, amplified, second polarization signals from all three feeds are also combined by a combiner 5-35 to produce a signal for the other polarization. First, two of the second polarization signals are each applied to a phase shifter 5-28, 5-29 and then to a respective attenuator 5-32, 5-33. As with the first polarization, the phase shifter and attenuators adjust the amplitude and phase of the signals from the feeds centered on the first-adjacent satellites so that they cancel any interference present on the center feed.

To generate a stacked output with both polarization signals, the outputs from the two combiners are applied to a third combiner 5-38 to produce the stacked output. To produce the frequency offset, an offset oscillator 5-36 generates a waveform that is applied to a mixer 5-37. The mixer takes one of the outputs of the first two combiners 5-34, 5-35, the second polarization combiner in the example of FIG. 10-5 and combines it with the offset oscillator waveform. This frequency shifts the signal from the lower combiner 5-35, before it is combined with the signal from the upper combiner 5-34 so the signals from the two orthogonal polarization modes are now transmitted on two different frequencies.

If the required combining coefficients for the two polarizations are the same, then the polarizations may be stacked before the signals from the feeds are combined. This may reduce the complexity and therefore the cost and power requirements of system, particularly for larger arrays, such as those which also cancel interference from second-adjacent satellites.

There are a variety of different ways that the two polarization signals may be stacked before the signals from the array feeds are combined. One approach is shown in FIG. 10-6. In FIG. 10-6, three dual-polarization feeds, 6-1 thru 6-3, receive a signal from a parabolic reflector or other source and generate two outputs each. They each provide one polarization output to one of a first set of three low-noise amplifiers 6-5, 6-7, 6-9 and the other polarization to a second one of set of three low-noise amplifiers 6-4, 6-6, 6-8. An offset oscillator 6-10, generates an offset frequency that is provided to a three-way splitter 6-11. Each output is provided to mixers 6-12, 6-13, 6-14 to combine with an amplified signal from each feed. This frequency-shifts one polarization signal from each feed. This frequency-shifted signal is then combined with the signal from the same feed having the other polarization in one of three combiners 6-15, 6-16, 6-17 one for each feed.

The outputs of the combiners each represent a stacked signal from each feed. These are each downconverted by a separate mixer 6-20, 6-21, 6-22. The mixers each receive a waveform from a local oscillator 6-18, through a splitter 6-19. The downconverted, stacked signals from each feed, are then amplified each by its own amplifier 6-23, 6-24, 6-25. Signals from two of the feeds, after the downconversion are applied each to a respective phase shifter 6-26, 6-27 and then an attenuator 6-28, 6-29. These adjust the amplitude and phase of the signals from the feeds centered on the first-adjacent satellites so that they cancel the interference present on the center feed. The signal from the center feed is not modified after downconversion. The signals from all three feeds are then combined by a combiner 6-30 to produce a stacked output with minimized distortion.

Another way to stack the two polarization signals before combining is to downconvert one polarization from each feed with one local oscillator frequency, and downconvert the other polarization from each feed with a second local oscillator frequency which differs from the first by the offset frequency. After the downconversion the two signals from each feed may be combined as shown by the combiners of, for example, FIG. 10-6.

Another way to stack the two polarization signals before combining is to downconvert both sets of signals with the same local oscillator frequency, and then offset one set using an offset oscillator and mixers.

A lesser or more equipped satellite antenna, LNBF and signal processing system than the examples described above may be preferred for certain implementations. Therefore, the configurations may vary from implementation to implementation depending upon numerous factors, such as price constraints, performance requirements, technological improvements, or other circumstances. Embodiments of the invention may also be applied to other types of communication systems to use small antennas for multiple nearby transmitters and receivers.

In the description above, for purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention may include various operations. The operations of embodiments of the present invention may be performed by hardware components, such as those shown in the Figures, or may be embodied in machine-executable instructions, which may be used to cause general-purpose or special-purpose processor, microcontroller, or logic circuits programmed with the instructions to perform the operations. Alternatively, the operations may be performed by a combination of hardware and software.

Many of the methods and apparatus are described in their most basic form but operations may be added to or deleted from any of the methods and components may be added or subtracted from any of the described apparatus without departing from the basic scope of the present claims. It will be apparent to those skilled in the art that many further modifications and adaptations may be made. The particular embodiments are not provided as limitations but as illustrations. The scope of the claims is not to be determined by the specific examples provided above but only by the claims below.

What is claimed is:

1. A method comprising:
   receiving a signal from a first satellite at a first feed;
   receiving a signal from a second satellite at a second feed;
   producing a first signal having a first polarization and a second signal having a second orthogonal polarization from the signal from each feed;
   phase shifting the signal from each of the two feeds;
   offsetting the frequency of the phase-shifted signals from each of the two feeds; and
   combining the phase-shifted, offset signal with the second signal from each feed, respectively to reduce interference from the second satellite on the signal from the first satellite.

2. The method of claim 1, wherein combining comprises offsetting and combining the signals from the two polarizations after the signals from the multiple feeds are combined.

3. The method of claim 1, wherein combining comprises offsetting and combining the signals and the signals from the two polarizations before the signals from the multiple feeds are combined.

4. The method of claim 3, wherein the signals from the two polarizations are offset before they are downconverted.

5. The method of claim 4, wherein the signals from the two polarizations are offset from each other after they are downconverted.

6. The method of claim 3, wherein the signals from the two polarizations are offset from each other by downconverting them with different local oscillator frequencies.

* * * * *